United States Patent Office 3,288,255
Patented Nov. 29, 1966

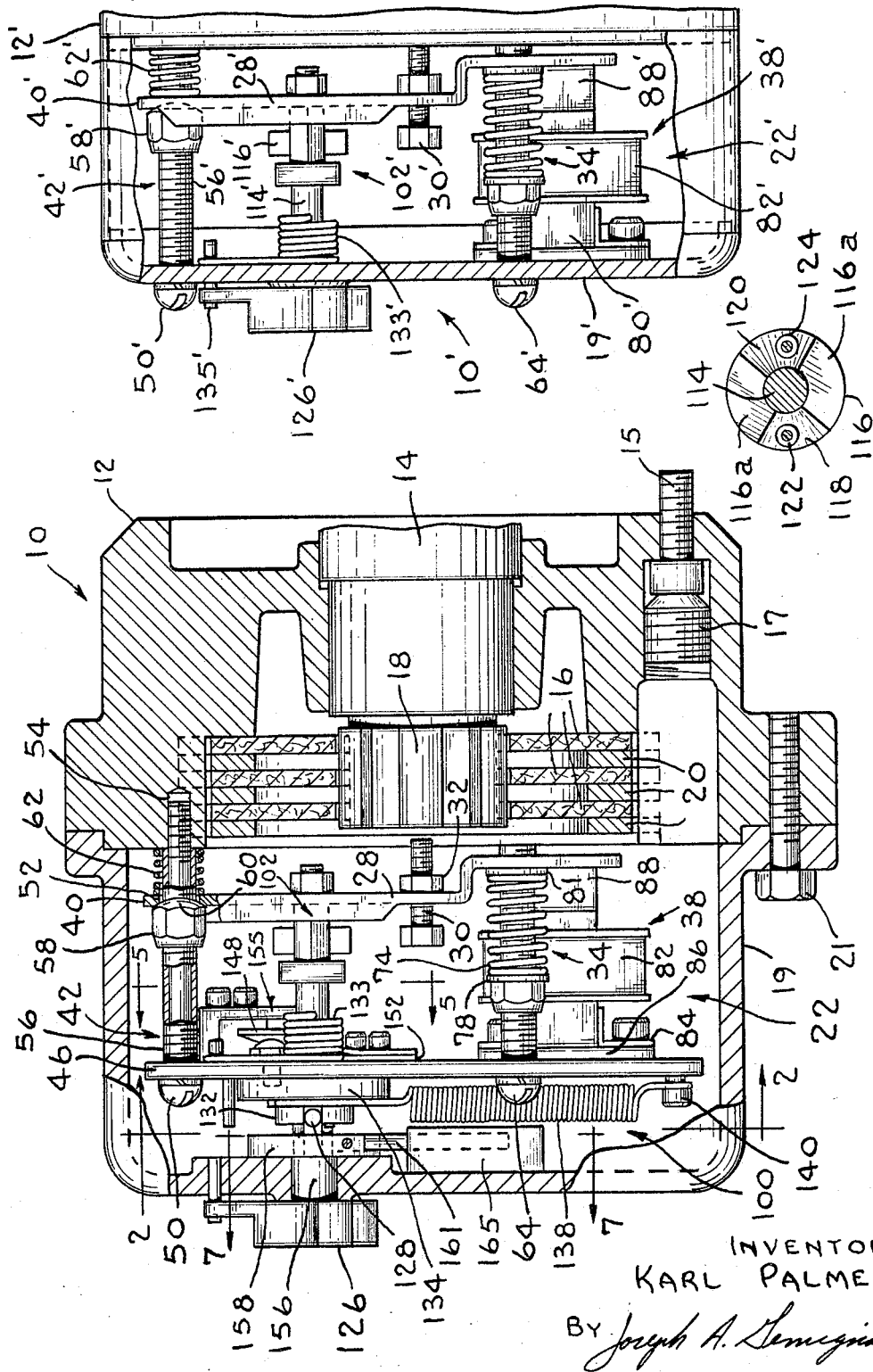

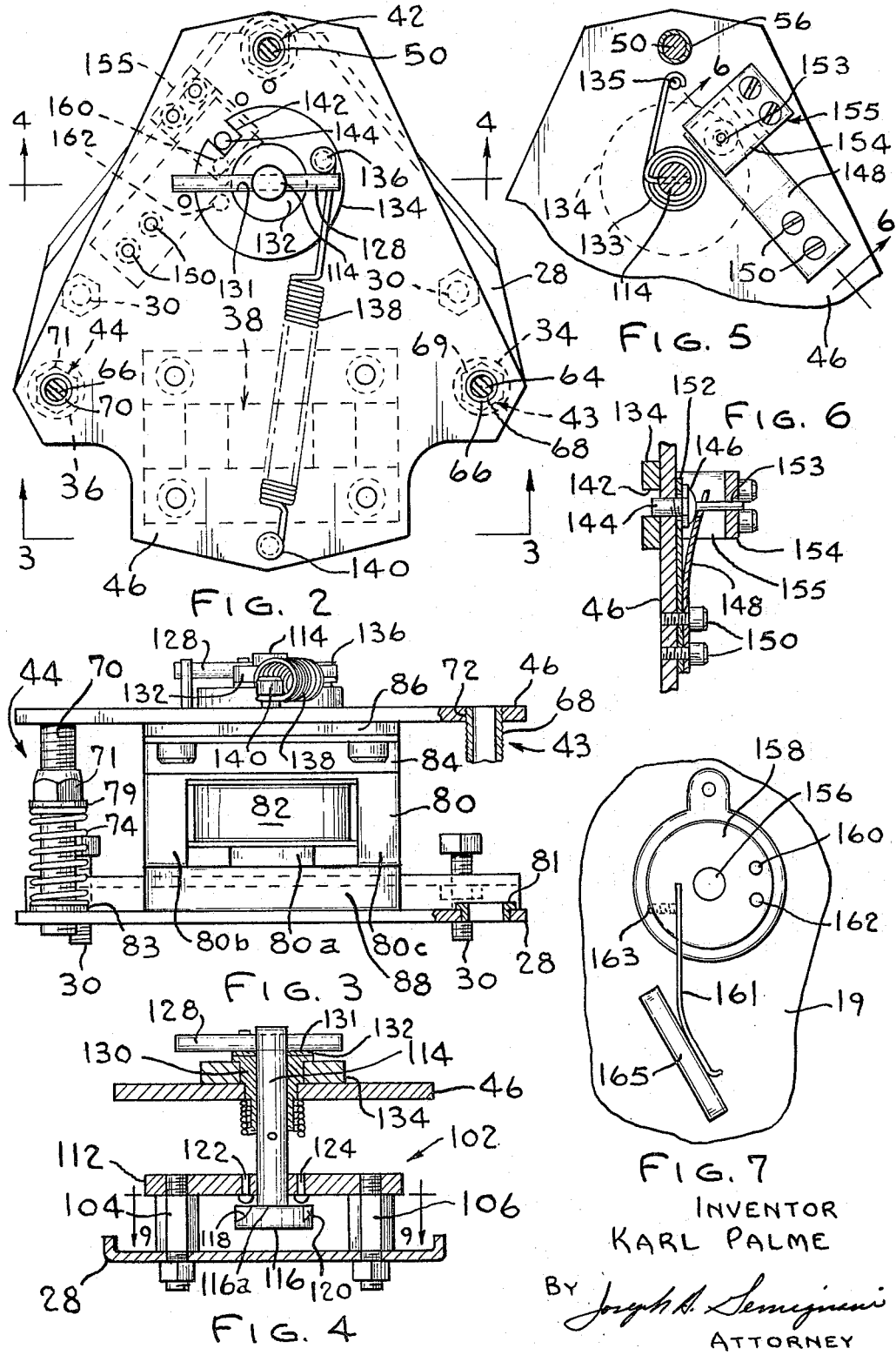

3,288,255
ROTARY MOTION CONTROL APPARATUS AND SAFETY RELEASE
Karl Palme, Milwaukee, Wis., assignor to Wehr Steel Company, Milwaukee, Wis., a corporation of Wisconsin
Filed July 29, 1964, Ser. No. 385,840
17 Claims. (Cl. 188—171)

This invention relates to rotary motion control apparatus and, more particularly, to a brake of the spring set electro-magnetic release-type and to an improved safety thermal release mechanism for rotary motion control apparatus.

Brakes of the type to which this invention relates are typically used in combination with a drive motor and may be operative in an explosive, inflammable or otherwise hazardous atmosphere in which case the temperature of the brake, for practical purposes the temperature of the brake housing, becomes a major consideration and temperatures above a particular critical temperature must be avoided. Brakes used in such applications are commonly referred to as hazardous location brakes and the temperature rise may occur, for example, as a result of defective or excessively repeated brake operation.

An object of this invention is to provide an improved safety release mechanism which prevents brake temperature exceeding a predetermined value.

These brakes can also have applications in a completely safe atmosphere in which case increases in brake temperature are not as critical a consideration and the safety release mechanism may not be required. Obviously, in such an application the additional cost of a safety release mechanism is unwarranted and brakes are supplied without a safety release, such brakes being commonly referred to as standard brakes. The manufacturer is then faced with the problem of offering two models, a hazardous location brake and a standard brake.

Accordingly, another object of this invention is to reduce the manufacturer's inventory by providing a brake operator assembly which is equally adaptable to use in either a hazardous location brake or a standard brake.

A further object of this invention is to provide an improved, simplified and yet effective brake operator assembly.

In the standard brake, as well as in the hazardous location brake, it is desirable to include a manual release for freeing the brake when desired. This manual release preferably takes the form a suitable control member accessible from exteriorly of the brake housing and connected to the operator assembly to release the brake members for relative movement when desired. A still further object of this invention is to provide a construction whereby the same basic release arrangement can be used in the hazardous location brake and the standard brake. However, in the hazardous location brake a thermally responsive operating mechanism is also associated with the release. The thermally responsive mechanism provides the safety release in the hazardous location brake of this invention and includes cam means which has one position in which the brake members can be released or set as desired and a second position in which it releases the brake members and locks them in their released position to prevent setting the brake member. The cam means is moved to its release position from its set position either manually or automatically by the thermal release.

Although this invention has been discussed and will be described in connection with a brake, features of the invention may find application in clutches and it will therefore be appreciated that this invention is intended to be applicable to rotary motion control apparatus in general and should not be limited to brake constructions.

Other objects and advantages will be pointed out in, or be apparent from, the specification and claims, as will obvious modifications of the embodiments shown in the drawings, in which:

FIG. 1 is a view of a hazardous location brake constructed in accordance with this invention and having portions thereof broken away to expose structural details;

FIG. 2 is a view taken generally along line 2—2 of FIG. 1;

FIG. 3 is a view taken generally along line 3—3 of FIG. 2 and with parts broken away to expose structural details;

FIG. 4 is a section view taken generally along line 4—4 of FIG. 2;

FIG. 5 is a view taken along line 5—5 of FIG. 1;

FIG. 6 is a section view taken generally along line 6—6 of FIG. 5;

FIG. 7 is a view taken along line 7—7 of FIG. 1;

FIG. 8 is partial view of a standard brake with the brake housing broken away to expose the operator assembly; and FIG. 9 is a view taken along line 9—9 of FIG. 4 and illustrating the cam followers aligned with the low points of the cam surfaces.

With particular reference to the drawings, brake 10 includes frame 12 in which hub 14 is suitably journaled, the hub being adapted for connection to the shaft of an electric, or otherwise suitably powered, motor (not shown). The brake is connected to the motor by a plurality of cap screws 15 which are locked in position by set screws 17 and housing 19 is connected to frame 12 by screws 21 to complete the outer structure of frame 10. Friction disks 16 are splined or otherwise suitably connected to end 18 of hub 14 for rotation with the hub. The friction disks are alternately arranged with and sandwiched between stationary disks 20 which are suitably connected to frame 12 to be held against rotation wih hub 14. The stationary and rotating disks provide a brake disk stack and provide the brake members which are selectively set to brake the motor and released to free the motor for rotation.

Brake 10 also includes operator assembly 22 which is connected to frame 12 in a manner to be described more completely hereinafter. The operator assembly is of the spring set electro-magnetic release-type and includes operator plate 28 which is supported for movement into and out of engagement with the disk stack to alternately set and release the friction and stationary disks to achieve brake operation. The actual engagement between the operator plate and the disk stack is completed through a pair of pressure screws 30 passing through a suitable aperture in the operator plate and engaged in nuts 32 fixed to the underside of the operator plate. With this arrangement screws 30 can be adjusted with respect to the operator plate to achieve a desired extension toward the disk stack.

Operator spring assemblies 34 and 36 set the brake and electromagnet 38 releases the brake by alternately pivoting operator plate 28 about its end 40 toward and away from the disk stack. In the hazardous location brake of FIG. 1, mounting plate 46 is connected to frame 12 by mounting stud assemblies 42, 43 and 44 with mounting stud assembly 42 cooperating structurally in providing the pivot for the operator plate and mounting stud assemblies 43 and 44 providing structural supports for operator spring assemblies 34 and 36.

More particularly, mounting stud assembly 42 includes a screw 50 which extends through an aperture in mounting plate 46, an opening 52 in end 40 of the operator plate and is anchored in a threaded hole 54 in frame 12. Post 56 is disposed around screw 50 and has one end threaded into an opening in plate 46 and has its opposite end abutting frame 12 (the engagement of the posts with the mounting plate is identical for all stud assemblies, see FIG. 3 for this detail in connection with assembly 43). The outer surface of post 56 is threaded and carries pivot nut 58 which includes semispherical face 60 disposed in opening 52. The edges of opening 53 are formed to provide a depression which is complementary to face 60 of the pivot nut. Compression spring 62 also surrounds post 56 and is seated between frame 12 and the undersurface of operator plate 28 to complete the pivotal mounting for the operator plate at end 40.

Mounting stud assemblies 43 and 44 are structurally substantially identical to mounting stud assembly 42. These mounting stud assemblies include screws 64 and 66 which extend through posts 68 and 70 and are engaged in suitable openings (not shown) in frame 12. Posts 68 and 70 are threaded on their outer surfaces and anchored in threaded openings 72 (see FIG. 3) in mounting plate 46 with their opposite ends abutting frame 12. Operator spring assemblies 34 and 36 are supported on posts 68 and 70 and structurally include stop nuts 69 and 71 threaded on posts 68 and 70 and disposed in spaced relationship from operator plate 28. Compression springs 74 and 76 are engaged between washer 78 and 79 which engage the underside of the stop nuts and washers 81 and 83 which engage the upper side of the operator plate. With this arrangement operator spring assemblies 34 and 36 bias armature plate 28 in a counterclockwise direction about end 40 and urge pressure screws 30 toward engagement with the disk stack. It should be noted that the mounting stud assemblies 42, 43 and 44, in addition to interconnecting the elements of the operator assembly and connecting the operator assembly to the frame, form a part of the pivotal connection for the operator plate and also form a part of an adjustable operator spring assembly thereby eliminating the need for additional mounting posts, screws, etc. for the various operator assembly elements and for the pivot while providing a secure and effective pivot for the operator plate.

Electromagnet 38 comprises an E-frame core 80 having a coil assembly 82 wound on the inner core leg 80a and between inner and outer core legs 80b and 80c. Core 80 is connected to mounting plate 46 by brackets 84 and has a rubber cushion 86 disposed between it and the mounting plate for most effective mounting. Armature 88 is suitably attached to the upper face of operator plate 28 and is disposed adjacent the ends of core legs 80a, 80b and 80c for attraction to core 80 when coil 82 is energized.

When electromagnet 38 is de-energized, operator spring assemblies 34 and 36 pivot operator plate 28 counterclockwise about its end 40 and into engagement with the disk stack to set the disks and brake the motor connected to hub 14. When the brake is set, armature 88 is spaced from the core legs and energization of coil 82 attracts the armature toward the core pivoting the operator plate in a clockwise direction about end 40 to release the disk stack and permit rotation of the electrical motor.

With the arrangement described, a particularly simplified pivot and operator spring assembly is provided to effect an overall simplification in operator assembly 22. To maintain this simplicity and achieve effective operation, pressure screws 30 are preferably positioned intermediate the pivot point for operator plate 28 (end 40) and the operator spring assemblies and the electromagnet. The operator plate has oppositely facing surfaces, one of which faces toward and the other of which faces away from the disk stack with pivot nut 50 and the operator spring assemblies engaging the same surface of the operator plate. This is a particularly advantageous arrangement since it permits the use of the relatively simplified pivot connection for end 40 (the pivot nut and compression spring 34) while maintaining optimum brake setting force through pressure screws 30. More particularly, when the brake is set the force of operator spring assemblies 34 and 36 is applied to the pressure points against a fixed pivot provided by nut 58 thereby transmitting the major portion of the spring force to the pressure screws for most effective setting. On the contrary, release of the brake is effected against compression spring 62 when the force required may not be as great as that required to set the brake so that any force lost by acting against the spring do not particularly effect brake operation.

The particular operator assembly described to this point lends itself equally well to use in a hazardous location brake or in a non-hazardous location, standard brake. The primary difference being that in the hazardous location brake a safety release mechanism is provided whereas the safety release mechanism can be eliminated in the standard brake. However, in the standard brake as well as the hazardous location brake, it is desirable to provide a manually operable brake release device. The standard brake construction together with a manually operable release mechanism will be described hereinafter, but before describing the standard brake the thermal release mechanism of this invention and its operation in the brake will be described.

The brake of FIG. 1 incorporates a thermal release mechanism and details of the mechanism are illustrated in FIGS. 2–6. The particular construction and arrangement of the operator assembly and the mounting stud assemblies permits positioning mounting plate 46 above the operator plate to afford a convenient mounting location for thermal release mechanism 100 and, as will become more apparent as this description proceeds, this arrangement also affords convenient use of the basic operator assembly in the standard brake. The release mechanism extends between the mounting plate and the operator plate and when operated acts against operator spring assemblies 34 and 36 to pivot operator plate 28 clockwise about its pivot point to release the disk stack and the brake. More particularly, lift bar assembly 102 is fixed to the operator plate and includes posts 104 and 106 which connect cross bar 112 and spaced relationship from the operator plate. Release shaft 114 extends through mounting plate 46 and cross bar 112 to support cam disk 116 adjacent the underside of the cross bar. Cam disk 116 is provided with a pair of cam surfaces 118 and 120 which is associated with cam followers 122 and 124 and fixed on the cross bar, the cam followers preferably taking the form of headed pins. When cam followers 122 and 124 are aligned with the low points of cam surfaces 118 and 120 the brake can be set and released without interference from the thermal release. The displacement of cam surfaces 118 and 120 is generally in the direction of movement of operator plate 28 and when the brake is set the followers are at the low points of the cam surfaces so that rotation of the release shaft in a clockwise direction, as viewed in FIG. 2, causes followers 122 and 124 to ride up on the cam surfaces to surface 116a and correspondingly pivot the operator plate clockwise to free the disk stack.

Rotation of release shaft 114 to release the brake can be achieved manually through an exteriorly disposed knob 126 or automatically by thermal release mechanism 100. The thermal release includes roll pin 128 extending through an aperture in one end of release shaft 114. Washer 132 is positioned on bushing 130 which is engaged in mounting plate 46 and roll pin 128 is engaged in diametrical slot 131 in washer 132. Thermal release cam 134 takes the form of an annular disk rotatably supported on bushing 130 and carries operating screw 136 which provides a seat for one end of thermal release spring 138 with the other end of the thermal release spring seated on an anchor 140 fixed to the mounting plate in a position remote from the thermal release cam. Spring 138 maintains screw 136 in engagement with roll pin 128. Notch 142 is provided in the periphery of thermal release cam 134 and lock pin 144 is supported in the path of rotation of notch 142 to selectively hold the thermal release cam 134 and lock pin 144 is supported particularly, lock pin 144 is threadedly engaged in adjusting nut 146 and extends through the adjusting nut to aperture 153 in guide bar 154, guide bar 154 being part of L-shaped bracket 155 attached to the underside of mounting plate 46. Leaf spring 148 is connected at one end to the mounting plate by screws 150 and engages adjusting nut 146 to bias pin 144 through the mounting plate into the path of rotation of notch 142 so that when the lock pin and notch 142 are in alignment the lock pin drops into the notch. Bimetal strip 152 is also anchored in the mounting plate by screws 150 and is positioned to engage the underside of nut 146 and, in response to an increase in temperature within the brake housing, flexes upwardly to retract pin 144 from notch 142 and release cam 134 for rotation by spring 138. This rotation of cam is transmitted through shaft 114 to rotate cam 116 to its position where followers 122 and 124 are engaged with upper surface 116a of the cam.

A driving connection is provided between knob 126 and shaft 114 through stud shaft 156 extending from the knob through cover 19 and carrying plate 158 which includes pins 160 and 162 adapted to be disposed on either side of roll pin 128 (see the dotted line showing of of these pins FIG. 2). To insure proper positioning of pins 160 and 162 with respect to roll pin 128 a leaf spring 161 is fixed to plate 158 by screw 163 and extends to and normally engages ledge 165. When the knob is being assembled spring 161 is engaged with the ledge to properly orient the pins with respect to the roll pin. Even with the thermal release cocked (pin 144 engaged in notch 142), the brake can be manually released by rotating knob 126 clockwise which in turn rotates roll pin 128 away from pin 136 and, correspondingly, rotates washer 132 and shaft 114 clockwise and with respect to locked cam 134. Return spring 133 is engaged between shaft 114 and pin 35 fixed on the mounting plate (see FIG. 5) and will automatically rotate the shaft and washer 132 counterclockwise when knob 126 is released to re-engage roll pin 128 with pin 136 and re-position the cam followers in alignment with the low points on cam surfaces 118 and 120.

In operation, cam 116 and followers 122 and 124 have two relative positions, one wherein cam followers 122 and 124 are in alignment with the low points on cam surfaces 118 and 120, which corresponds to a condition wherein the brake can be set and released as desired, and the other wherein cam followers 122 and 124 are in engagement with upper surface 116a of the cam and the brake is held in its released position and the operator assembly cannot be operated to set the disk stack and the brake. In operation, the thermal release is set by rotating knob 126 counterclockwise to correspondingly rotate thermal release cam 134 counterclockwise thereby moving cam followers 122 and 124 into alignment with the low points on cam surfaces 118 and 120 and engaging lock pin 144 in notch 142 to lock the release mechanism in this position. This movement of the knob also cocks spring 138 so that spring 138 is now biasing cam 116 to its position wherein followers 122 and 124 are in engagement with surface 116a but is ineffective due to lock pin 144 being engaged in notch 142, i.e. the thermal release is cocked. The brake will function with the operator plate alternately setting and releasing the disk stack. Should the temperature within the brake housing increase and exceed a particular pre-set critical temperature, bimetal 52 will flex sufficiently to withdraw lock pin 144 from notch 142. Withdrawal of the lock pin releases thermal release cam 134 and permits springs 138 to drive the thermal release cam 116 to its second position causing followers 122 and 124 to ride up on cam surfaces 118 and 120 and release the brake disks. After the thermal release has operated the brake will not function until the brake is reset by rotating knob 126 counterclockwise to again position the lock pin 144 in notch 142, obviously this will not occur until the brake has cooled below the critical temperature allowing spring 138 to return pin 144 into engagement in notch 142. Accordingly, the brake cannot exceed the critical temperature.

Turning now to FIG. 8, the standard brake will be described and prime numbers will be used to identify parts which are identical to those of the hazardous location brake described in connection with FIGS. 1-7. In this embodiment, brake 10' includes operator assembly 22' comprising operator plate 28' and operator assemblies 34' and 36' (only one illustrated in FIG. 8). The pivot for operator plate 28' is provided by pivot nut 58' supported on mounting stud assembly 42' and compression spring 62' seated between the under surface of operator the same relationship between pressure screws 30', the pivot end 40' of the operator plate, the operator spring assemblies and electromagnet 38' as in the hazardous location brake to achieve the same effective operation while maintaining a simplified construction. It will be noted, however, that in this instance the mounting plate has been eliminated and the mounting stud assemblies are attached directly to cover 19' with the core 80' of the electromagnet being attached directly to the underside of cover 19'. The primary difference in this embodiment is in the elimination of the mounting plate and the thermal release mechanism and in this embodiment knob 126' is connected directly to release shaft 114' with the shaft extending through cover 19' directly to lift bar assembly 102'. Cam 116' is again associated with cam followers arranged on the lift bar identically to cam followers 122 and 124 and rotation of knob 126' is transmitted directly to the lift bar to pivot the operator plate in a clockwise direction to release the disk stack. Return spring 133' has one end seated on shaft 114', is coiled around the shaft and is anchored on a fixed pin 135' which in this embodiment also functions as a stop to limit rotation of control knob 126'. The standard brake can be operated to alternately set and release the disk stack and the brake with the release mechanism providing for selective manual release when and if desired.

It will be noted that the same basic operator assembly is used in both the standard and hazardous location brake thereby achieving an interchangeability of parts and assemblies to reduce inventory. Where the operator assembly is to be used in a hazardous location brake it is used with a mounting plate and thermal release but where used in a standard brake the thermal release and mounting plate are eliminated and connection is made directly to the housing cover, the cover in effect providing the mounting plate. It will be appreciated that it is conceivable that with a minor modification in parts the mounting plate could be eliminated even in the hazardous location brake and the thermal release attached directly to the cover, however, the mounting plate is preferred as it facilitates assembly and arranges the thermal release in virtually one basic subassembly.

Although this invention has been illustrated and described in connection with particular embodiments thereof, is will be apparent to those skilled in the art that various changes and modifications may be made therein without departing from the spirit of the invention or from the scope of the appended claims.

What I claim is:

1. Rotary motion control apparatus comprising, in combination,
   frame means,
   a disk stack comprising at least one stationary disk fixed with respect to said frame means and at least one rotatable disk free from said frame means for rotation with respect to said stationary disk,
   a mounting plate spaced from said frame means,
   an operator plate disposed intermediate said mounting plate and said frame means, said operator plate having a first surface facing toward said disk stack and a second surface facing away from said disk stack, a plurality of mounting means extending from said frame means to said mounting plate and connecting said mounting plate to said frame means, a first one of said mounting means extending through said operator plate and including means providing a pivotal connection about which said operating plate assembly is movable toward and away from said disk stack to set and release said rotatable disk, said means providing said pivotal connection comprising a first seat member supported on said first mounting means and engaging said second operator plate surface and spring means arranged on said first mounting means and connected to said first operator plate surface to bias said operator plate into engagement with said seat member, a second one of said mounting means extending through said operating plate and supporting an operator spring assembly in engagement with said second operating plate surface and biasing said operating plate toward said disk stack to set said rotatable disk, said operator plate including pressure means extending toward and engageable with said disk stack and arranged intermediate said pivotal connection and said operator spring assembly and magnetic means, magnetic means associated with said operator plate and operative when activated to move said operating plate assembly away from said disk stack, and release means operatively connected to said operator plate for selectively moving said operator plate away from said disk stack independently of said magnetic means.

2. The rotary motion control apparatus of claim 1 wherein said operator spring assembly includes a second seat member and means adjustably connecting said second seat member on said second mounting means for adjustable movement relative to said frame means to assume a predetermined fixed position on said second mounting means, said second seat arranged intermediate said operator plate and said mounting plate and said operator spring assembly also including a spring seated between said second seat member and said second surface of said operator plate to bias said operator plate toward said disk stack.

3. The rotary motion control apparatus of claim 2 wherein said magnetic means is arranged on the second surface side of operator plate and comprises a coil and core assembly attached to one of said mounting plate and operator plate and an armature connected to the other of said mounting plate and operator plate in alignment with said coil and core assembly.

4. The rotary motion control apparatus of claim 3 wherein said release means includes a portion disposed exteriorly of said apparatus and extends into said apparatus through said mounting plate for connection with said operator plate.

5. The rotary motion control apparatus of claim 4 wherein said release means comprises, cam means engageable with said operator plate and having a first position freeing said operator plate for movement to selectively set and release said disk stack and a second position wherein said operator plate is locked in a position releasing said disk stack and against operation to set said brake members, a control member disposed exteriorly of said apparatus, shaft means connected to said control member and extending into the apparatus and connected to said cam means for moving said cam means between its first and second positions, and release spring means connected to said shaft means and opposing movement of said shaft means in a direction to move said cam means to its second position so that said cam means is automatically returned to its second position.

6. The rotary motion control apparatus of claim 5 wherein said mounting plate comprises an outer cover for said apparatus.

7. The rotary motion control apparatus of claim 4 wherein said apparatus includes a cover and wherein the extension of said release means passes through said cover and said mounting plate toward said operator plate and includes lift means connected to said operator plate, cooperating cam means on said extension and said lift means for selectively moving said operator plate away from said disk stack in response to movement of said release means and releasing said operator plate for movement toward said disk stack, and thermal release means supported on said mounting plate and connected with and operative to move said extension, said thermal means responsive to the temperature in said apparatus and effective to operate said cam surfaces to move said operator plate away from said disk stack when the temperature in said apparatus exceeds a predetermined value.

8. The rotary motion control apparatus of claim 5 wherein said apparatus includes a cover and wherein the extension of said release means passes through said cover and said mounting plate toward said operator plate and includes said shaft means, and wherein said release means also includes, lift means connected to said operator plate, cooperating cam means on said shaft and said lift means for selectively moving said operator plate away from said disk stack in response to movement of said release means and releasing said operator plate for movement toward said disk stack, and thermal release means supported on said mounting plate and connected with and operative to move said shaft, said thermal means responsive to the temperature in said apparatus and effective to operate said cam surfaces to move said operator plate away from said disk stack when the temperature in said apparatus exceeds a predetermined value.

9. The rotary motion control apparatus of claim 8 wherein said cam means in said shaft and lift means have two relative positions, a first position freeing the operator plate for movement by said operator spring assembly and said magnetic means and a second position releasing said disk stack and holding said operator plate against movement to set said disk stack and against the bias of said operator springs, and wherein said thermal release means includes second means mounted for movement on said mounting plate and connected to said cam means to move said cam means between said first and second positions thereof, spring means connected to said second means and having a seat remote from said second means and fixed relative to said mounting plate, said spring means arranged so that movement of said second means to move said cam means to its first position is against the force of said spring means, and thermally responsive means engaging said second means to hold said second means against movement when said cam means is in its first position and movable out of engagement with said second means when the temperature in said apparatus exceeds a predetermined value to thereby release said second means for movement by said spring means to correspondingly move said cam means to its second position.

10. Thermal release means for use in rotary motion control apparatus having a rotable brake member, a fixed brake member, and operating means for moving said brake members relative to each other to selectively clamp said brake members against and free said brake members for relative rotational movement therebetween, said thermal release means comprising, in combination,
- a cam follower,
- a cam engaging said cam follower and having a displacement in the direction of clamping and freeing movement of said brake members,
- said cam follower connected to said operating means and said cam having a first position wherein said operating means is freed to selectively set and release said brake members and a second position wherein said operating means is locked in a position releasing said brake members and against operation to set said brake members,
- and means for moving said cam between said first and second positions and including a manually operable member connected to and movable with said cam, spring means connected to said manually operable member and opposing movement of said manually operable member to move said cam to said first cam position, lock means normally disposed in the path of movement of said manually operable member to engage said manually operable member as it moves said cam to said first cam position and operative to hold said manually operable member and cam in said first cam position and against return to said second cam position, and thermally responsive member connected to said lock means and exposed to the temperature within said apparatus, said thermally responsive member normally positioning said lock means in said path of movement and operative, when said temperature exceeds a predetermined value, to move said lock means out of said path of movement to free said manually operable member and cam for movement to said second cam position by said spring means and thereby free said brake members for relative rotational movement.

11. Thermal release means for use in rotary motion control apparatus having a rotatable brake member, a fixed brake member, an operator plate supported for movement toward and away from said brake members to selectively clamp said brake members against and free said brake members for relative rotational movement therebetween, and means for moving said operator plate toward and away from said brake members, said thermal release means comprising, in combination,
- cam means connected to said operator plate and having a first position releasing said operator plate to selectively set and release said brake members and a second position locking said operator plate in a position away from said brake members and against movement toward said brake members, said cam means having a cam displacement when moving between said first and second cam positions effective to move said operator away from said brake members so that said cam means is operative in moving from said first cam position to said second cam position to release said brake members for relative rotational movement,
- spring means,
- means connecting said spring means to said cam means to oppose movement of said cam means from said second cam position to said first cam position,
- lock means for holding said cam means in said first cam position and against movement to said second cam means position,
- and thermally responsive means connected to said lock means and exposed to the temperature within said apparatus for actuating said cam means for movement to said second cam means position by said spring means when said temperature exceeds a predetermined value.

12. Thermal release means for use in a brake having an operator assembly of the spring set and electromagnet release-type and comprising, in combination,
- cam means connected to said operator assembly and having a first position freeing said operator assembly for movement to selectively set and release said brake and a second position holding said operator assembly in its released position and against movement to its set position,
- means for moving said cam means between said first and second cam means position and including spring means opposing movement of said cam means to said first cam means position,
- and thermally responsive means exposed to the temperature within said brake and normally holding said cam means in said first cam means position against return to said second cam means position, said thermally responsive means further operative when said temperature exceeds a predetermined value to release said cam means for movement to said second cam position by said spring means.

13. In a brake having a fixed brake member and a rotatable brake member arranged for rotation relative to said fixed brake member and an operator plate mounted for movement generally parallel to the axis of rotation toward and away from said brake members to selectively clamp said brake members against release and said brake members for relative rotational movement therebetween, the combination with said operator plate of thermal release means comprising, in combination,
- a cam follower connected to said operator plate for joint movement therewith,
- a cam engaging said cam follower and having a cam displacement extending in a direction generally parallel to said axis, said cam having a first position freeing said operator plate for movement to selectively clamp and free said brake and a second position locking said operator plate in a position away from said brake members and against movement toward said brake members,
- means for moving said cam between said first and second cam positions and including spring means opposing cam movement to said first position,
- and thermally responsive means exposed to the temperature within said brake and arranged for connection with said cam to hold said cam in said first cam position and operative when said temperature exceeds a predetermined value to release said cam means for movement by said spring means to said second position.

14. The combination of claim 13 wherein said brake includes a mounting plate spaced from said operator plate and said means for moving said cam comprises,
- an actuating member rotatably mounted on said mounting plate,
- a shaft connected to and movable with said cam,
- means connecting said shaft and actuating member for joint movement,
- and means connecting said spring means to said actuating members and to a point on said mounting plate remote from said actuating member.

15. The combination of claim 14 wherein said actuating member includes a notch and wherein said thermal release means comprises,
- a pin supported in the path of movement of said notch and arranged to register with said notch when said cam means is in said first cam position,
- spring means biasing said pin toward engagement in said notch,
- and a bimetal connected to said mounting plate and engaging said pin, said bimetal arranged to flex in response to increase temperature in said brake and move said pin out of said notch so that said actuating member is released for movement when said temperature exceeds a predetermined value.

16. The combination of claim 15 wherein said means connecting said shaft and actuating member is also operative to permit relative movement between said shaft and actuating member and wherein said brake includes a cover and said shaft extends through said mounting plate toward said cover, and including
  a control member rotatably supported on said cover exteriorly of said brake,
  means connecting said knob to said shaft for manually rotating said shaft to move said cam means to its first and second positions,
  and return spring means arranged to oppose movement of said shaft to move said cam to its second position so that said apparatus can be manually released and said shaft automatically returns to a position wherein said cam is in its first position.

17. Rotary motion control apparatus comprising, in combination,
  frame means,
  a disk stack comprising at least one stationary disk fixed with respect to said frame means and at least one rotatable disk free from said frame means for rotation with respect to said stationary disk,
  a mounting plate spaced from said frame means,
  an operator plate,
  a plurality of mounting means extending from said frame means to said mounting plate and said operator plate and connecting said mounting plate and operator plate to said frame means, a first one of said mounting means including means engaging said operator plate and providing a pivotal connection about which said operator plate is movable toward and away from said disk stack to set and release said rotatable disk, a second one of said mounting means including an operator spring assembly operatively connected to and biasing said operator plate toward said disk stack to set said rotatable disk,
  magnetic means associated with said operating plate and operative when activated to move said operator plate away from said disk stack and release said rotatable disk,
  and release means operatively connected to said operator plate for selectively moving said operator plate away from said disk stack independently of said magnetic means, said release means including lift means connected to said operator plate, cam means engageable with said lift means for selectively moving said operator plate away from said disk stack and releasing said operator plate for movement toward said disk stack, and thermal release means connected with and operative to move said cam means, said thermal means exposed to the temperature in said apparatus and operative in response to a temperature in said apparatus above a predetermined value to operate said cam means to move said operator plate away from said disk stack.

References Cited by the Examiner

UNITED STATES PATENTS

| | | | |
|---|---|---|---|
| 2,026,513 | 12/1935 | Trombetta | 188—171 |
| 2,214,807 | 9/1940 | Buckley | 188—171 X |
| 2,966,240 | 12/1960 | Aude et al. | 188—171 |
| 3,171,515 | 3/1965 | Wolfe | 188—171 |

DUANE A. REGER, *Primary Examiner.*